US011955096B2

(12) United States Patent
Ma et al.

(10) Patent No.: US 11,955,096 B2
(45) Date of Patent: Apr. 9, 2024

(54) DISPLAY METHOD OF DISPLAY PANEL, DISPLAY DEVICE, AND SERVER

(71) Applicant: WUHAN CHINA STAR OPTOELECTRONICS TECHNOLOGY CO., LTD., Wuhan (CN)

(72) Inventors: Changwen Ma, Wuhan (CN); Zhou Zhang, Wuhan (CN); Guowei Zha, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 255 days.

(21) Appl. No.: 17/599,457

(22) PCT Filed: Jul. 12, 2021

(86) PCT No.: PCT/CN2021/105664

§ 371 (c)(1),
(2) Date: Sep. 28, 2021

(87) PCT Pub. No.: WO2022/262032

PCT Pub. Date: Dec. 22, 2022

(65) Prior Publication Data

US 2023/0237972 A1 Jul. 27, 2023

(30) Foreign Application Priority Data

Jun. 15, 2021 (CN) ......................... 202110659130.6

(51) Int. Cl.
*G09G 3/20* (2006.01)
*G09G 3/36* (2006.01)

(52) U.S. Cl.
CPC ... *G09G 3/3607* (2013.01); *G09G 2300/0452* (2013.01); *G09G 2310/08* (2013.01); *G09G 2340/0435* (2013.01)

(58) Field of Classification Search
CPC ......... G09G 3/3607; G09G 2300/0452; G09G 2310/08; G09G 2340/0435; G09G 3/36; G09G 3/3406

(Continued)

(56) References Cited

U.S. PATENT DOCUMENTS

2008/0284768 A1* 11/2008 Yoshida ............... G09G 3/2022 345/208
2010/0026722 A1* 2/2010 Kondo ................... H04N 17/00 345/660

(Continued)

FOREIGN PATENT DOCUMENTS

CN 1755440 A 4/2006
CN 104019404 A 9/2014

(Continued)

OTHER PUBLICATIONS

International Search Report in International application No. PCT/CN2021/105664 dated Mar. 10, 2022.

(Continued)

*Primary Examiner* — Thuy N Pardo
(74) *Attorney, Agent, or Firm* — PV IP PC; Wei Te Chung; Zhigang Ma

(57) ABSTRACT

A display method of a display panel, a display device, and a server are disclosed. The display method divides an initial image into a plurality of sub-frame images having a same frequency, and the frequency of the sub-frame images is a multiple of a frequency of the initial image. The sub-frame images are input into the display panel in sequence and are combined to obtain a target image. The target image is used (Continued)

to drive the display panel to display the initial image, thereby reducing a refresh rate of the display panel for inputting data. Therefore, the display panel can realize low frequency input and prevent frame loss.

17 Claims, 5 Drawing Sheets

(58) Field of Classification Search
USPC .......................................... 345/77, 55, 56, 59
See application file for complete search history.

(56) References Cited

U.S. PATENT DOCUMENTS

| | | | | |
|---|---|---|---|---|
| 2013/0293598 | A1* | 11/2013 | Ishihara | G09G 3/3648 345/88 |
| 2015/0339968 | A1* | 11/2015 | Yoshioka | G02F 1/1368 345/89 |
| 2016/0078824 | A1* | 3/2016 | Meador | H05B 45/3725 345/212 |
| 2016/0086583 | A1* | 3/2016 | Oshima | G06T 1/0028 345/629 |
| 2017/0330501 | A1* | 11/2017 | Kobayashi | G09G 3/3406 |
| 2018/0182304 | A1 | 6/2018 | Lee et al. | |
| 2019/0052360 | A1* | 2/2019 | Aoyama | H04L 7/0075 |
| 2019/0088193 | A1* | 3/2019 | Tada | G06F 3/04845 |
| 2020/0190017 | A1 | 6/2020 | Blagg et al. | |
| 2020/0222029 | A1* | 7/2020 | Baba | G01S 15/8927 |

FOREIGN PATENT DOCUMENTS

| | | | |
|---|---|---|---|
| CN | 104299575 | A | 1/2015 |
| CN | 104820577 | A | 8/2015 |
| CN | 110931542 | A | 3/2020 |
| WO | 2019004072 | A1 | 1/2019 |

OTHER PUBLICATIONS

Written Opinion of the International Searching Authority in International application No. PCT/CN2021/105664, dated Mar. 10, 2022.

Chinese Office Action in corresponding Chinese Patent Application No. 202110659130.6 dated Jan. 12, 2022, pp. 1-10.

* cited by examiner

DISPLAY METHOD OF DISPLAY PANEL, DISPLAY DEVICE, AND SERVER

RELATED APPLICATIONS

This application is a Notional Phase of PCT Patent Application No. PCT/CN2021/105664 having international filing date of Jul. 12, 2021, which claims the benefit of priority of Chinese Patent Application No. 202110659130.6 filed on Jun. 15, 2021. The contents of the above applications are all incorporated by reference as if fully set forth herein in their entirety.

FIELD OF INVENTION

The present disclosure relates to the field of display technologies, and more particularly, to a display method of a display panel, a display device, and a server.

BACKGROUND OF INVENTION

At present, display modules are generally composed of glass panels of RGB color filters (CFs) and backlight modules. The glass panels are disposed on the backlight modules, and white light emitted from the backlight modules are converted into red light, green light, and blue light after passing the CFs with red, green, and blue colors. In this way, display devices can display color images. Brightness of the white light emitted from the backlight modules will be reduced after passing the CFs, so backlights having high brightness are needed. Since this will cause much power consumption, color sequential display devices are developed, which use a temporal color mixture method, that is, using backlights having different colors to cooperate with panel data to display color effects. Therefore, the CFs can be omitted, and costs can be saved.

In current color sequential display devices, backlight sources are turned off when data is written, and after the data is written, the backlight sources having corresponding colors are turned on. However, in practical applications, high frame rate display has higher requirements for software and hardware, and software and hardware being not up to standard is prone to cause images to lose frames, so it is easy to have abnormal color mixture for the color sequential display devices.

Technical problem: at present, the display modules are generally composed of the glass panels of RGB color filters (CFs) and the backlight modules. The glass panels are disposed on the backlight modules, and the white light emitted from the backlight modules are converted into red light, green light, and blue light after passing the CFs with red, green, and blue colors. In this way, the display devices can display color images. The brightness of the white light emitted from the backlight modules will be reduced after passing the CFs, so the backlights having high brightness are needed. Since this will cause much power consumption, the color sequential display devices are developed, which use the temporal color mixture method, that is, using backlights having different colors to cooperate with panel data to display color effects. Therefore, the CFs can be omitted, and costs can be saved.

In current color sequential display devices, backlight sources are turned off when data is written, and after the data is written, the backlight sources having corresponding colors are turned on. However, in practical applications, high frame rate display has higher requirements for software and hardware, and software and hardware being not up to standard is prone to cause images to lose frames, so it is easy to have abnormal color mixture for the color sequential display devices.

SUMMARY OF INVENTION

An embodiment of the present disclosure provides a display method of a display panel and a display device to solve problems of abnormal color mixture caused by display panels being prone to lose frames when displaying in current technology.

In a first aspect, an embodiment of the present disclosure provides a display method of a display panel, wherein, the display panel includes a plurality of display areas arranged in an order from top to bottom, and the method includes:

obtaining an initial image that needs to be displayed, wherein, the initial image is one of frame images of the display panel displayed in a target time;

dividing the initial image into a plurality of sub-frame images, wherein, frequencies of the sub-frame images are same and are a multiple of a frequency of the initial image;

taking each of the sub-frame images as a target sub-frame image, respectively, and inputting the target sub-frame image into the display areas in sequence; and in a display time of the initial image, combining the sub-frame images to obtain a target image and displaying the target image in the display panel.

Further, the step of dividing the initial image into the plurality of sub-frame images includes following steps:

obtaining the frequency corresponding to the initial image;

obtaining a red component, a blue component, and a green component of the initial image; and dividing the initial image into a red sub-frame image, a blue sub-frame image, and a green sub-frame image having a same frequency according to the red component, the blue component, and the green component, wherein, the sub-frame images include the red sub-frame image, the blue sub-frame image, and the green sub-frame image having the same frequency.

Further, the step of taking each of the sub-frame images as the target sub-frame image, respectively, and inputting the target sub-frame image into the display areas in sequence, includes following steps:

sorting the sub-frame images in a default order to obtain the sub-frame images after sorting;

taking the sub-frame images after sorting as a first target sub-frame image, a second target sub-frame image, and a third target sub-frame image, respectively;

inputting the first target sub-frame image into the display areas in sequence;

after inputting the first target sub-frame image, delaying a default buffer time and inputting the second target sub-frame image into the display areas in sequence; and after inputting the second target sub-frame image, delaying the default buffer time and inputting the third target sub-frame image into the display areas in sequence.

Further, each of the display areas includes a plurality of pixel units arranged in an array, and the display areas are arranged in the order from top to bottom;

the step of inputting the first target sub-frame image into the display areas in sequence includes following steps:

inputting the first target sub-frame image into a plurality of rows of the pixel units in a determined display area at a same time; and after the first target sub-frame image is completely input into the determined display area, the first target sub-frame image is input into a next display area adjacent to the determined display area to realize inputting the first target sub-frame image into the display areas in sequence.

Further, after the step of inputting the first target sub-frame image into the display areas in sequence, the method further includes:

after inputting the first target sub-frame image into the display areas in sequence, sending a clock signal to the display panel and giving a hint to input the second target sub-frame image into the display areas in sequence.

Further, each of the display areas includes a plurality of pixel units arranged in an array, and the method further includes following steps:

after inputting the target sub-frame image into the display areas in sequence, the pixel units in the display areas are turned on; and controlling data to be written into the pixel units in the display areas at a same time.

Further, the step of after inputting the first target sub-frame image, delaying the default buffer time and inputting the second target sub-frame image into the display areas in sequence, includes following steps:

after inputting the first target sub-frame image, waiting for liquid crystals in the display panel to response and backlights to be turned on;

after delaying the default buffer time, determining if the liquid crystals in the display panel response and the backlights are turned on; and if the liquid crystals response and the backlights are turned on, inputting the second target sub-frame image into the display areas in sequence.

Further, after the step of in the display time of the initial image, combining the sub-frame images to obtain the target image and displaying the target image in the display panel, the method further includes:

after delaying the default buffer time, inputting a next frame image adjacent to the initial image.

Further, the display panel includes a plurality of rows of the pixel units arranged in the array, and the default buffer time ranges from a time required for turning on 200 rows of the pixel units to a time required for turning on 400 rows of the pixel units.

Further, the default buffer time is a time required for turning on 300 adjacent rows of the pixel units in the display panel.

Further, the frequencies of the sub-frame images are n*m, n refers to a type of the sub-frame images, and m refers to the frequency of the initial image.

Further, n is 3, and the initial image is divided into three sub-frame images of RGB.

Further, the frequency corresponding to the initial image is 60 HZ, and the frequencies of the sub-frame images are 180 HZ.

Further, the step of dividing the initial image into the plurality of sub-frame images includes following steps:

obtaining the frequency corresponding to the initial image;

obtaining a red component, a blue component, a green component, and a white component of the initial image; and dividing the initial image into a red sub-frame image, a blue sub-frame image, a green sub-frame image, and a white sub-frame image having a same frequency according to the red component, the blue component, the green component, and the white component, wherein the sub-frame images comprise the red sub-frame image, the blue sub-frame image, the green sub-frame image, and the white sub-frame image having the same frequency.

Further, the frequency corresponding to the initial image is 60 HZ, and the frequencies of the sub-frame images are 240 HZ.

Further, a frequency of the target image is same as the frequency of the initial image.

In a second aspect, an embodiment of the present disclosure further provides a display device, which is configured to drive a display panel to display images, wherein, the display panel includes a plurality of display areas arranged in an order from top to bottom, and the display device includes:

an obtaining module configured to obtain an initial image that needs to be displayed, wherein, the initial image is one of frame images of the display panel displayed in a target time;

a dividing module configured to divide the initial image into a plurality of sub-frame images, wherein, frequencies of the sub-frame images are same and are a multiple of a frequency of the initial image;

an input module configured to take each of the sub-frame images as a target sub-frame image, respectively, and input the target sub-frame image into the display areas in sequence; and a driving module configured to combine the sub-frame images to obtain a target image in a display time of the initial image and display the target image in the display panel.

Further, the dividing module is configured to: obtain the frequency corresponding to the initial image;

obtain a red component, a blue component, and a green component of the initial image; and divide the initial image into a red sub-frame image, a blue sub-frame image, and a green sub-frame image having a same frequency according to the red component, the blue component, and the green component, wherein the sub-frame images comprise the red sub-frame image, the blue sub-frame image, and the green sub-frame image having the same frequency.

Further, a target display area includes a plurality of rows of pixel units arranged in an array, and the input module is configured to: sort the sub-frame images in a default order to obtain the sub-frame images after sorting; take the sub-frame images after sorting as a first target sub-frame image, a second target sub-frame image, and a third target sub-frame image, respectively; input the first target sub-frame image into the display areas in sequence; after inputting the first target sub-frame image, delay a default buffer time and input the second target sub-frame image into the display areas in sequence; and after inputting the second target sub-frame image, delay the default buffer time and input the third target sub-frame image into the display areas in sequence.

In a third aspect, an embodiment of the present disclosure further provides a server, which includes:

one or more processors;

a memory device; and one or more applications, wherein, the applications are stored in the memory device and configured to execute the display method of the display panel mentioned above by the processors.

Beneficial effect: the display method of the display panel and the display device provided in the embodiments of the present disclosure divide the initial image that needs to be displayed into the plurality of sub-frame images having the same frequency, and the frequency of the sub-frame images is a multiple of the frequency of the initial image. The sub-frame images are input into the display panel in the default order and are combined to obtain the target image. The target image is used to drive the display panel to display the initial image, thereby reducing a refresh rate of the initial image input by the display panel. Therefore, the display panel can realize low frequency input and prevent frame loss and color mixture phenomena.

DESCRIPTION OF DRAWINGS

The following detailed description of specific embodiments of the present disclosure will make the technical solutions and other beneficial effects of the present disclosure obvious with reference to the accompanying drawings.

DETAILED DESCRIPTION OF PREFERRED EMBODIMENTS

Figure 1:
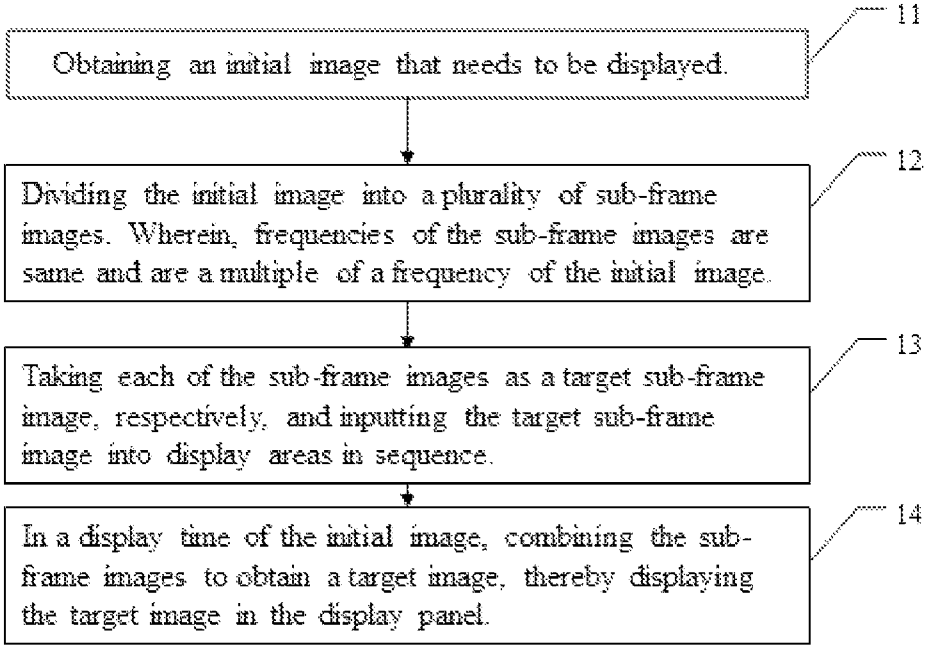
FIG. 1 is a flowchart of a display method of a display panel according to an embodiment of the present disclosure.

The technical solutions in the embodiments of the present disclosure will be clearly and completely described below with reference to the drawings in the embodiments of the present disclosure. Obviously, the described embodiments are only a part of the embodiments of the present disclosure, but not all the embodiments. Based on the embodiments in the present disclosure, all other embodiments obtained by those skilled in the art without creative efforts are within the scope of the present disclosure.

In the description of the present disclosure, it should be understood that terms such as "center", "longitudinal", "lateral", "length", "width", "thickness", "upper", "lower", "front", "rear", "left", "right", "vertical", "horizontal", "top", "bottom", "inside", "outside", "clockwise", "counterclockwise", as well as derivative thereof should be construed to refer to the orientation as described or as shown in the drawings under discussion. These relative terms are for convenience of description, do not require that the present disclosure be constructed or operated in a particular orientation, and shall not be construed as causing limitations to the present disclosure. In addition, terms such as "first" and "second" are used herein for purposes of description and are not intended to indicate or imply relative importance or implicitly indicating the number of technical features indicated. Thus, features limited by "first" and "second" are intended to indicate or imply including one or more than one of these features. In the description of the present disclosure, "a plurality of" relates to two or more than two, unless otherwise specified.

In the description of the present disclosure, it should be noted that unless there are express rules and limitations, the terms such as "mount," "connect," and "bond" should be comprehended in broad sense. For example, it can mean a permanent connection, a detachable connection, or an integrated connection; it can mean a mechanical connection, an electrical connection, or can communicate with each other; it can mean a direct connection, an indirect connection by an intermediary, or an inner communication or an inter-reaction between two elements. A person skilled in the art should understand the specific meanings in the present disclosure according to specific situations.

In the description of the present disclosure, unless specified or limited otherwise, it should be noted that, a structure in which a first feature is "on" or "beneath" a second feature may include an embodiment in which the first feature directly contacts the second feature and may also include an embodiment in which an additional feature is formed between the first feature and the second feature so that the first feature does not directly contact the second feature. Furthermore, a first feature "on," "above," or "on top of" a second feature may include an embodiment in which the first feature is right "on," "above," or "on top of" the second feature and may also include an embodiment in which the first feature is not right "on," "above," or "on top of" the second feature, or just means that the first feature has a sea level elevation greater than the sea level elevation of the second feature. While first feature "beneath," "below," or "on bottom of" a second feature may include an embodiment in which the first feature is right "beneath," "below," or "on bottom of" the second feature and may also include an embodiment in which the first feature is not right "beneath," "below," or "on bottom of" the second feature, or just means that the first feature has a sea level elevation less than the sea level elevation of the second feature.

The following description provides many different embodiments or examples for implementing different structures of the present disclosure. In order to simplify the present disclosure, the components and settings of a specific example are described below. Of course, they are merely examples and are not intended to limit the present disclosure. In addition, the present disclosure may repeat reference numerals and/or reference letters in different examples, which are for the purpose of simplicity and clarity, and do not indicate the relationship between the various embodiments and/or arrangements discussed. In addition, the present disclosure provides examples of various specific processes and materials, but one of ordinary skill in the art will recognize the use of other processes and/or the use of other materials.

An embodiment of the present disclosure provides a display method of a display panel and a display device, which will be described as follows.

As shown in FIG. 1, FIG. 1 is a flowchart of the display method of the display panel according to an embodiment of the present disclosure. The display method may include following steps.

Step 11: obtaining an initial image that needs to be displayed.

In the embodiment of the present disclosure, since each of images that is actually displayed in the display panel is a result of superimposing a plurality of frame images and is already a final image that undergoes various processing, it is necessary to obtain the initial image before processing.

In the embodiment of the present disclosure, the initial image is one of the frame images of the display panel that is displayed in a target time. That is, the embodiment of the present disclosure is to process any one of the frame images that needs to be displayed, thereby improving a final displayed image.

Step 12: dividing the initial image into a plurality of sub-frame images. Wherein, frequencies of the sub-frame images are same and are a multiple of a frequency of the initial image.

Current display panels usually display color pictures, that is, each of the frame images includes a plurality of RGB sub-frame images. In this embodiment, the initial image is further divided to obtain the sub-frame images, and the sub-frame images have a same frequency. At a same time, in the embodiment of the present disclosure, the initial image is a frame image, and in one frame time required for refreshing the initial image of the display panel, in fact, an image merged by the sub-frame images is refreshed. Therefore, it is necessary to input all the sub-frame images into the display panel in a time corresponding to one frame image, so the frequencies of the sub-frame images are a multiple of the frequency of the initial image. The frequencies of the sub-frame images may be n*m, wherein, n refers to a type of the sub-frame images and is usually 3, that is, one frame color image is divided into three sub-frame images of RGB, and m refers to the frequency of the initial image, a unit of the frequency is HZ, and the frequency of the initial image is usually 60 HZ. At this time, the frequencies of the sub-frame images are 180 HZ.

In another embodiment of the present disclosure, one frame color initial image may also be divided into four sub-frame images of RGBW, and when the frequency of the initial image is 60 HZ, the frequencies of the sub-frame images are 240 HZ.

It should be noted that in the embodiment, instead of directly inputting the sub-frame images into the display panel, the initial image having a low frequency is directly input into the display panel, and the initial image is divided into the sub-frame images inside the display panel.

Step 13: taking each of the sub-frame images as a target sub-frame image, respectively, and inputting the target sub-frame image into display areas in sequence.

In the embodiment of the present disclosure, the display panel is divided into a plurality of display areas arranged in an order from top to bottom. When an image is actually displayed, the initial image is input to the display areas in sequence to allow the display areas to display different pictures, and the pictures displayed by the display areas are spliced to be a complete image.

Therefore, when the sub-frame images are used for display, the sub-frame images are also input into the display areas, respectively to realize display.

Specifically, any one of the sub-frame images may be taken as the target sub-frame image, respectively, then the target sub-frame image is input into the display areas in sequence to allow the display panel to display the target sub-frame image, and then the sub-frame images are merged to realize display.

Step 14: in a display time of the initial image, combining the sub-frame images to obtain a target image, thereby displaying the target image in the display panel.

Specifically, when the sub-frame images are input into the display panel, it is necessary to merge the sub-frame images to obtain the target image, and the display panel is refreshed using the target image to allow the display panel to display the target image. The target image is the initial image.

It should be noted that in the above embodiments, since the initial image is one frame image displayed in the display panel, all the display areas of the display panel need to display pictures in the one frame time that displays the initial image to obtain the initial image that finally needs to be displayed. Therefore, it is necessary to refresh the display areas of the display panel using the sub-frame images in the display time of the initial image, thereby allowing the display panel to display the initial image.

That is, in the embodiment of the present disclosure, the frequency of the initial image that is input is same as that of the image that is actually displayed. However, since the target image merged by the sub-frame images is used to refresh the display areas in the one frame time of inputting the initial image, the frequencies of the sub-frame images used to refresh the display panel are greater than the frequency of the initial image.

The display method of the display panel provided in the embodiments of the present disclosure divides the initial image that needs to be displayed into the plurality of sub-frame images having the same frequency, and the frequency of the sub-frame images is a multiple of the frequency of the initial image. The sub-frame images are input into the display panel in a default order and are combined to obtain the target image. The target image is used to drive the display panel to display the initial image, thereby reducing a refresh rate of data input by the display panel. Therefore, the display panel can realize low frequency input and prevent frame loss and color mixture phenomena.

Figure 2:
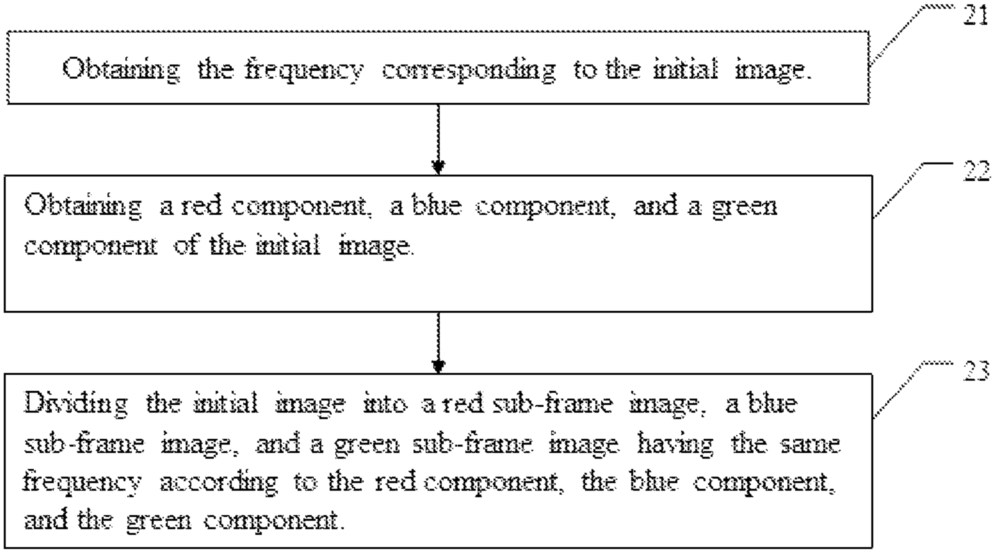
FIG. 2 is a flowchart of dividing an initial image into a plurality of sub-frame images according to an embodiment of the present disclosure.

As shown in FIG. 2, FIG. 2 is a flowchart of dividing the initial image into the plurality of sub-frame images according to an embodiment of the present disclosure, which includes following steps.

Step 21: obtaining the frequency corresponding to the initial image.

Step 22: obtaining a red component, a blue component, and a green component of the initial image.

Step 23: dividing the initial image into a red sub-frame image, a blue sub-frame image, and a green sub-frame image having the same frequency according to the red component, the blue component, and the green component.

In the embodiment, the sub-frame images are written into the display panel in an order, and then they are merged into a frame image to realize display.

Wherein, the initial image may be divided into the sub-frame images corresponding to three primary colors (red, green, and blue; RGB) according to color components. Therefore, it is necessary to obtain the red component (R component), the blue component (B component), and the green component (G component) of the initial image, and then the initial image is divided into the red sub-frame image, the blue sub-frame image, and the green sub-frame image according to the red component, the blue component, and the green component.

In the embodiment of the present disclosure, the sub-frame images include the red sub-frame image, the blue sub-frame image, and the green sub-frame image, frequencies of the red sub-frame image, the blue sub-frame image, and the green sub-frame image are same, and the frequency of any one of them is the multiple of the frequency of the initial image.

Figure 3:
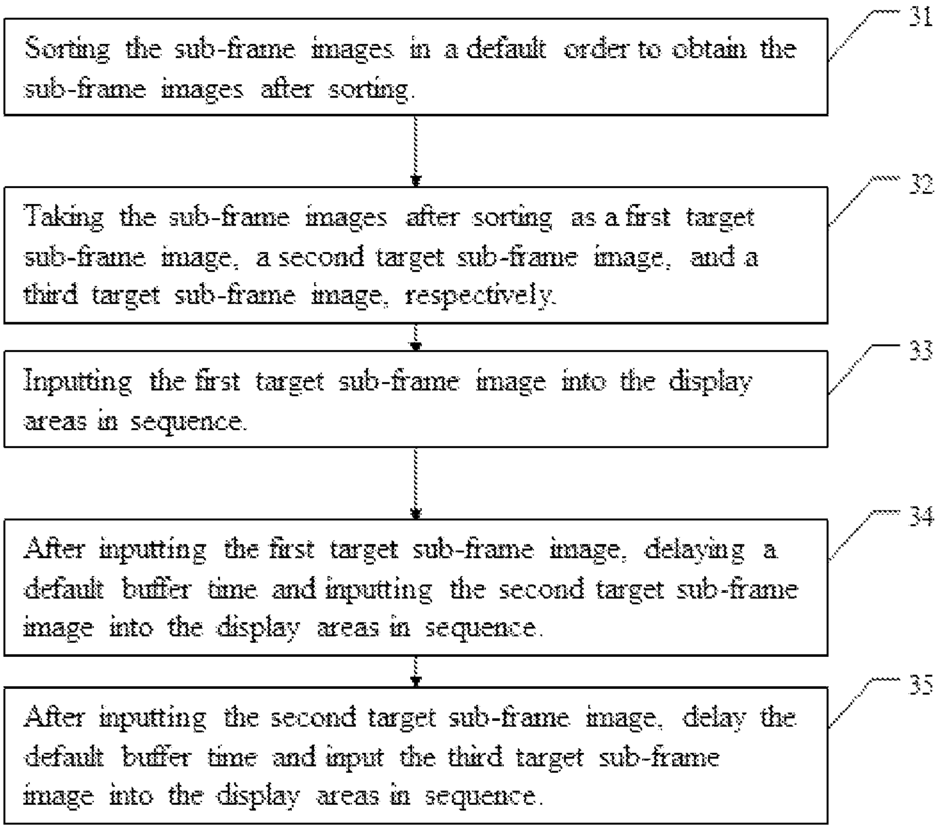
FIG. 3 is a flowchart of inputting a target sub-frame image into a plurality of display areas according to an embodiment of the present disclosure.

As shown in FIG. 3, FIG. 3 is a flowchart of inputting the target sub-frame image into the plurality of display areas according to an embodiment of the present disclosure, which may include following steps.

Step 31: sorting the sub-frame images in the default order to obtain the sub-frame images after sorting.

Step 32: taking the sub-frame images after sorting as a first target sub-frame image, a second target sub-frame image, and a third target sub-frame image, respectively.

Step 33: inputting the first target sub-frame image into the display areas in sequence.

Step 34: after inputting the first target sub-frame image, delaying a default buffer time and inputting the second target sub-frame image into the display areas in sequence.

Step 35: after inputting the second target sub-frame image, delay the default buffer time and input the third target sub-frame image into the display areas in sequence.

In the embodiment, the sub-frame images are input into a target display area in the default order rather than at a same time.

In the embodiment of the present disclosure, the display panel usually includes a plurality of rows and columns of pixel units that are arranged in an array. The images displayed by the display panel are actually the pixel units being turned on or turned off after receiving external signals, and the external signals are input into the pixel units in an order from top to bottom. Specifically, the initial image may be input into the pixel units of the display panel from the pixel unit in a first row and a first column to all other pixel units in the first row in sequence, and after the initial image is input into all the pixel units in the first row, the initial image is then input into the pixel units in a second row.

The display time of one frame may include a data writing time, a liquid crystal response time, and a backlight turn-on time, and display effect is better if the backlight turn-on time is longer. Therefore, the data writing time and the liquid crystal response time are required to be shorter. However, since the liquid crystal response time is related to characteristics of liquid crystal materials and is difficult to change, the data writing time is required to be shorter as much as possible, that is, reducing a time required for inputting the sub-frame images into the display panel.

Figure 4:
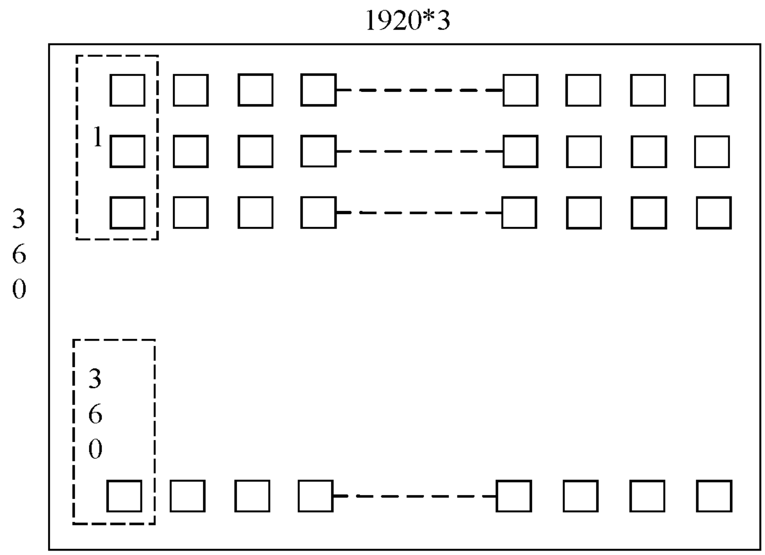
FIG. 4 is a schematic diagram of the display panel according to an embodiment of the present disclosure.

Therefore, in the embodiments of the present disclosure, the display panel may be divided into the plurality of display areas, each of the display areas includes a plurality of rows of the pixel units arranged in the array, and the display areas are arranged in the order from top to bottom. As shown in FIG. 4, FIG. 4 is a schematic diagram of the display panel according to an embodiment of the present disclosure. In FIG. 4, the display panel is divided into the plurality of display areas, and each of the display areas includes a plurality of rows and columns of the pixel units arranged in the array.

Therefore, when one of the sub-frame images is input into the display areas in sequence, in fact, it is inputting the sub-frame image into the plurality of rows of the pixel units in a determined display area at a same time. After the sub-frame image is completely input into the determined display area, the sub-frame image is input into a next display area adjacent to the determined display area to realize inputting the sub-frame image into the display areas in sequence.

In current display panels, each of the pixel units is connected to one gate line and one source line. Each of the pixel units is turned on under control of the gate line, and at this time, the sub-frame image is input into each of the pixel units from the source line to control the pixel units to display the sub-frame image.

In the embodiment of the present disclosure, the sub-frame image may be input into a plurality of gate lines at a same time to reduce the time required for inputting the sub-frame images into the display panel. Specifically, a number of the gate lines of the display panel may be reduced to allow the pixel units in adjacent rows to share the gate lines, and the sub-frame images may be input into the pixel units in the adjacent rows at the same time by the shared gate lines.

In the above embodiments, a time for turning on each row of the pixel units remains unchanged, and the sub-frame image is input into the plurality of rows and columns of pixel units arranged in the array at the same time, which also reduces a total data writing time, thereby extending the backlight turn-on time and improving the display effect. However, while reducing the gate lines or sharing the gate lines to reduce the gate lines, it is necessary to increase a number of source lines, thereby remaining pixels of the display panel unchanged.

In the embodiment shown in FIG. 4, a resolution of the display panel is 1920*1080, that is, resolutions of the initial image and each of the sub-frame images are also 1920*1080, and at this time, if the number of the gate lines is reduced to 360, the total data writing time becomes ⅓ of an original total data writing time when the time for turning on each row of the pixel units remains unchanged. As shown in FIG. 4, FIG. 4 is a schematic diagram of reduced gate lines according to an embodiment of the present disclosure.

Since the gate lines are reduced, correspondingly, it is necessary to increase the source lines or a number of source channels to keep the resolution of the images unchanged. That is, the resolution of the images is changed from 1920*1080 to 1920*360*3. However, since the initial image is divided into the sub-frame images for inputting, the sub-frame images being RBG sub-frame images are taken as an example, and the resolution at this time is:

$$1920RGB*1080=1920R*1920*360*3+1920G*1920*360*3+1920B*19\ 20*360*3.$$

In the above embodiments, the sub-frame images are input into the display areas in the default order. In addition, only after one of the sub-frame images is completely input into the display areas, a next sub-frame image will be input into the display panel.

In the embodiment of the present disclosure, the sub-frame images may be arranged in the default order to obtain the sub-frame images after sorting, and the sub-frame images after sorting may be a first target sub-frame image, a second target sub-frame image, and a third target sub-frame image, respectively.

The first target sub-frame image is input into the display areas from a first row of a first display area of the display panel, and after the first target sub-frame image is input into all the display areas, the second target sub-frame image is input into the display areas from the first row of the first display area of the display panel. Similarly, after the second target sub-frame image is input into all the display areas, the third target sub-frame image is input into the display areas from the first row of the first display area of the display panel.

After the first target sub-frame image, the second target sub-frame image, and the third target sub-frame image are input into all the display areas, the first target sub-frame image, the second target sub-frame image, and the third target sub-frame image exist in the display panel, and at this time, the first target sub-frame image, the second target sub-frame image, and the third target sub-frame image are merged into one image for obtaining the target image that the display panel finally displays. The target image is used to refresh the display panel. Wherein, the target image is the initial image that needs to be displayed.

In a specific embodiment of the present disclosure, the red sub-frame image may be taken as the first target sub-frame image, that is, the red sub-frame image is input into the display areas in sequence first. After finishing inputting the red sub-frame image, a clock signal is sent to the display panel, and a hint to take the green sub-frame image as the second target sub-frame image for inputting into the display areas in sequence is given. After finishing inputting the green sub-frame image, the clock signal is sent to the display panel again, and a hint to take the blue sub-frame image as the third target sub-frame image for inputting into the display areas in sequence is given, thereby allowing the target display area to include the red sub-frame image, the green sub-frame image, and the blue sub-frame image.

It should be noted that after one of the sub-frame images is input, it also needs to wait for the liquid crystals in the target display area to response and the backlights to be turned on, so when a different sub-frame image is input into the display panel, it needs to delay a default buffer time, which is mainly used to wait for the liquid crystals to response and the backlights to be turned on. That is, after one of the sub-frame images is input, it is necessary to delay the default buffer time and then to input a next sub-frame image.

Inputting the second target sub-frame image is taken as an example, the step of after inputting the first target sub-frame image, delaying the default buffer time and inputting the second target sub-frame image into the display areas in sequence, may include following steps:

after inputting the first target sub-frame image, waiting for the liquid crystals in the display panel to response and the backlights to be turned on;

after delaying the default buffer time, determining if the liquid crystals in the display panel response and the backlights are turned on; and if the liquid crystals response and the backlights are turned on, inputting the second target sub-frame image into the display areas in sequence.

Wherein, target pixel units may include a plurality of rows of pixel units that are arranged in the array, that is, the sub-frame image is input into the plurality of rows of pixel units in the display panel at the same time.

Figure 5:
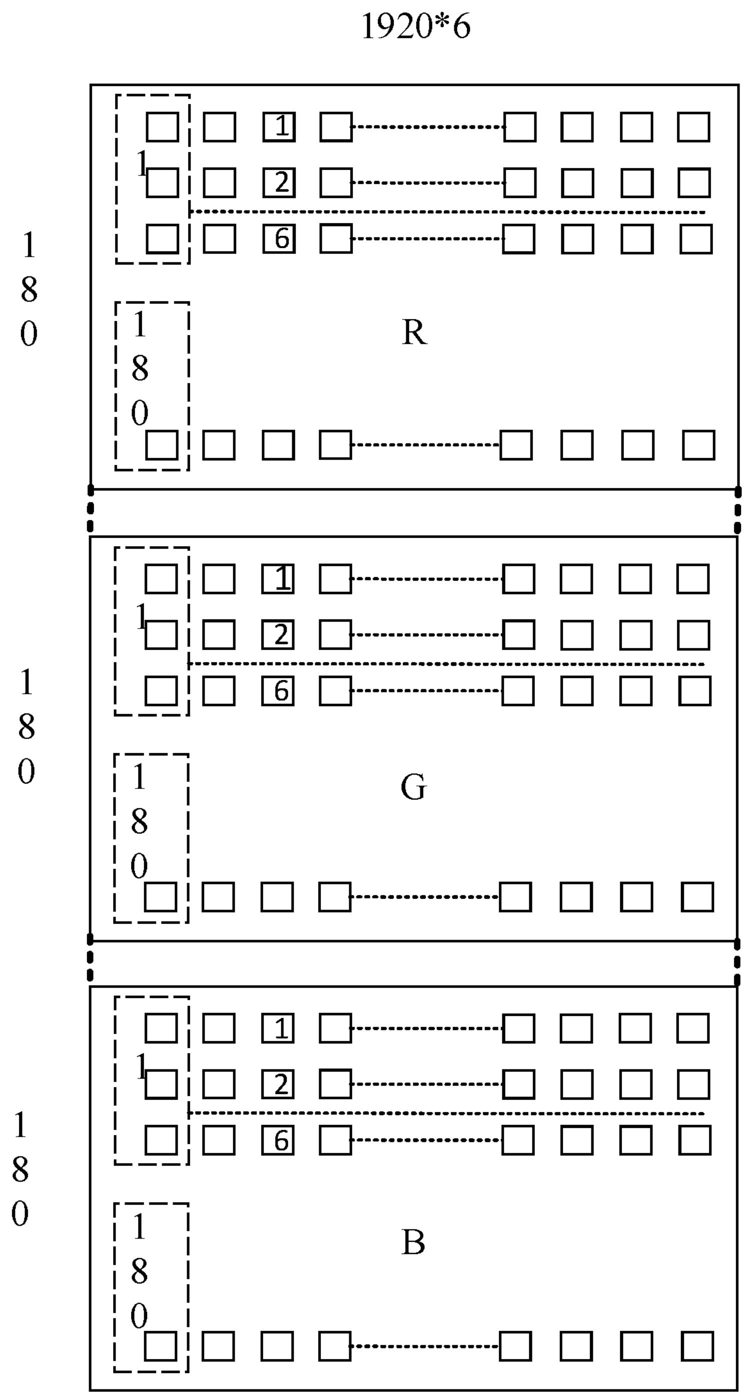
FIG. 5 is a schematic diagram of the sub-frame images for splicing according to an embodiment of the present disclosure.

As shown in FIG. 5, FIG. 5 is a schematic diagram of the sub-frame images for splicing according to an embodiment of the present disclosure. Wherein, the red sub-frame image, the green sub-frame image, and the blue sub-frame image are input into the display panel, respectively. After all the sub-frame images are input into the display panel, the sub-frame images are merged to obtain the initial image that finally needs to be displayed.

In the above embodiments, after the target sub-frame image is input into the display areas in sequence, the pixel units in the display areas are turned on, and the data is controlled to be written into the pixel units in the display areas at the same time. Specifically, since the target sub-frame image is input into the plurality of rows of the pixel units in a determined display area at the same time to allow the plurality of rows of the pixel units to be turned on at the same time, it is necessary to input the data to the plurality of rows of the pixel units that are turned on at the same time.

In the embodiments of the present disclosure, each of the sub-frame images corresponds to a buffer time for waiting for the liquid crystals to response and the backlights to be turned on, so there is also another buffer time between different frame images. That is, when any two adjacent frame images are input into the display panel, it is also necessary to delay the default buffer time between the two adjacent frame images. Therefore, in the display time of the initial image, after the sub-frame images are merged to obtain the target image for the display panel to display the target image, it is necessary to delay the default buffer time and then to input the next frame image that is adjacent to the initial image.

Figure 6:
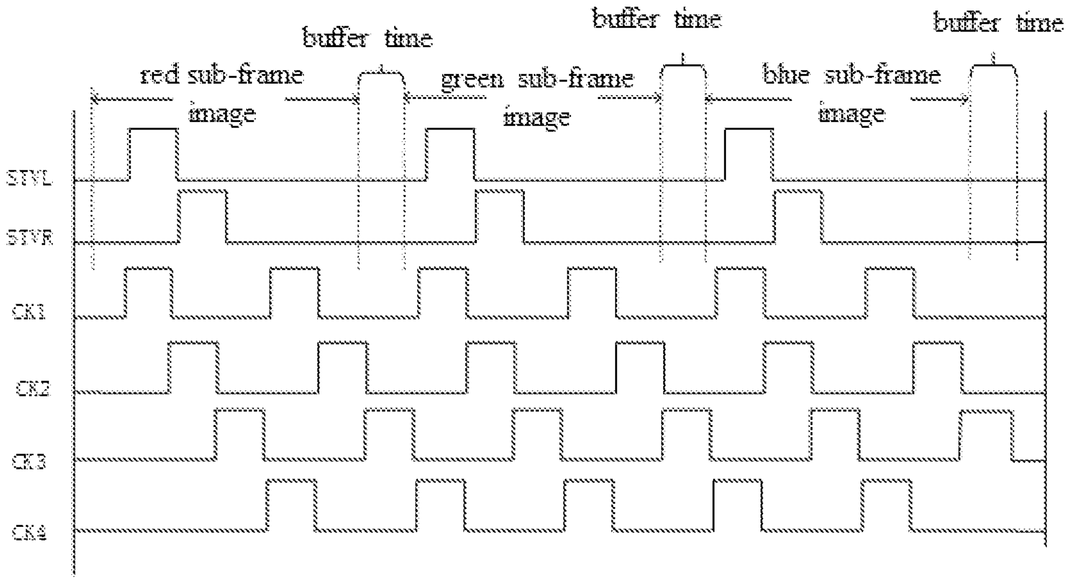
FIG. 6 is a schematic diagram of driving signals according to an embodiment of the present disclosure.

As shown in FIG. 6, FIG. 6 is a schematic diagram of driving signals according to an embodiment of the present disclosure. in the embodiment shown in FIG. 6, the initial image is divided into three sub-frame images of RGB, and each of the sub-frame images corresponds to one buffer time. The three sub-frame images of RGB have a same frequency, which is three times the frequency of the initial image. That is, a time for the three sub-frame images of RGB to finish inputting into the display panel for refreshing is same as a time required to refresh the initial image.

In FIG. 6, both STVL and STVR are the driving signals corresponding to the initial image. STVL and STVR may be input into the display panel from different areas of the display panel, so STVL and STVR may be same or different. CK1, CK2, CK3, and CK4 are clock signals.

It should be noted that in the embodiment of the present disclosure, the buffer time may also be used to adjust interval times between different sub-frame images, thereby preventing frame loss. In addition, each of the sub-frame images corresponds to one buffer time.

In a specific embodiment of the present disclosure, since the display panel includes the plurality of rows of the pixel units arranged in the array, the buffer time may range from a time required for turning on 200 rows of the pixel units to a time required for turning on 400 rows of the pixel units. That is, a duration of the buffer time ranges from a duration of the time required for turning on 200 rows of the pixel units to the time required for turning on 400 rows of the pixel units in the display panel.

In a specific embodiment of the present disclosure, the buffer time is a time required for turning on 300 adjacent rows of the pixel units in the display panel. In a period corresponding to the buffer time, the liquid crystals response and the backlights of the display panel are turned on after the sub-frame image is input.

In a specific embodiment of the present disclosure, the frequency corresponding to the initial image may be 60 HZ. At this time, the initial image is divided into the sub-frame images of RGB, and the frequency corresponding to the sub-frame images is 180 HZ. The sub-frame images of 180 HZ are input into the display panel in sequence in the default order, but the image that the display panel finally displays is a result of merging the sub-frame images rather than single one of the sub-frame images. It will not occur abnormal color mixture caused by losing single sub-frame image when a merged image is used for the display panel to realize display, and even if frame loss occurs, it will just lose all the sub-frame images at the same time.

In other embodiments of the present disclosure, the initial image may also be divided into a plurality of sub-frame images of RGBW, and specifically may include following steps: obtaining the frequency corresponding to the initial image; obtaining the red component, the blue component, the green component, and the white component of the initial image; and dividing the initial image into the red sub-frame image, the blue sub-frame image, the green sub-frame image, and a white sub-frame image having a same frequency according to the red component, the blue component, the green component, and the white component. Wherein, the sub-frame images include the red sub-frame image, the blue sub-frame image, the green sub-frame image, and the white sub-frame image having the same frequency.

In the above embodiment, since the initial image is divided into four sub-frame images, when the frequency of the initial image is 60 HZ, the frequencies of the sub-frame images are 240 HZ.

It should be noted that in the embodiment of the present disclosure, the initial image that is input is a low frequency image, and the initial image is divided into the plurality of sub-frame images after inputting into the display panel. The sub-frame images are input into the display panel in sequence, and then the display panel merges the sub-frame images to obtain the target image, thereby realizing display by refreshing the target image.

Since it is necessary to input all the sub-frame images into the display panel in the display time corresponding to one frame image, so the frequencies of the sub-frame images are a multiple of the frequency of the initial image. The frequency of the target image obtained by merging the sub-frame images is the same as the frequency of the initial image, thereby allowing the display panel to realize low frequency input and low frequency output.

Figure 7:
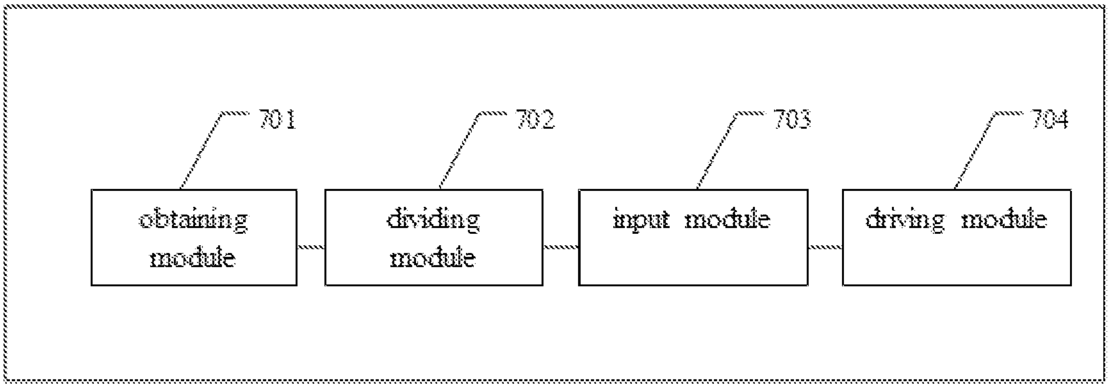
FIG. 7 is a schematic diagram of a display device according to an embodiment of the present disclosure.

An embodiment of the present disclosure further provides a display device. As shown in FIG. 7, FIG. 7 is a schematic diagram of the display device according to an embodiment of the present disclosure. The display device is configured to drive the display panel to display images, and the display panel includes the plurality of the display areas. The display device may include:

an obtaining module 701 configured to obtain the initial image that needs to be displayed, wherein, the initial image is one of the frame images of the display panel displayed in a target time;

a dividing module 702 configured to divide the initial image into the plurality of sub-frame images, wherein the frequencies of the sub-frame images are same and are a multiple of the frequency of the initial image;

an input module 703 configured to take each of the sub-frame images as the target sub-frame image, respectively, and input the target sub-frame image into the display areas in sequence; and a driving module 704 configured to combine the sub-frame images to obtain the target image in the display time of the initial image and display the target image in the display panel.

The display device provided in the embodiment of the present disclosure divides the initial image that needs to be displayed into the plurality of sub-frame images having the same frequency, and the frequency of the sub-frame images is a multiple of the frequency of the initial image. The sub-frame images are input into the display panel in the default order and are combined to obtain the target image. The target image is used to drive the display panel to display the initial image, thereby reducing the refresh rate of data input by the display panel. Therefore, the display panel can realize low frequency input and prevent frame loss and color mixture phenomena.

In some embodiments of the present disclosure, the step of dividing the initial image into the plurality of sub-frame images by the dividing module, wherein, the frequencies of the sub-frame images are same and are a multiple of the frequency of the initial image, may include following steps:

the dividing module 702 obtaining the frequency corresponding to the initial image; obtaining the red component, the blue component, and the green component of the initial image; and dividing the initial image into the red sub-frame image, the blue sub-frame image, and the green sub-frame image having the same frequency according to the red component, the blue component, and the green component, wherein the sub-frame images include the red sub-frame image, the blue sub-frame image, and the green sub-frame image having the same frequency.

In some embodiments of the present disclosure, specifically, the input module 703 may be configured to: sort the sub-frame images in the default order to obtain the sub-frame images after sorting; take the sub-frame images after sorting as the first target sub-frame image, the second target sub-frame image, and the third target sub-frame image, respectively; input the first target sub-frame image into the display areas in sequence; after inputting the first target sub-frame image, delay the default buffer time and input the second target sub-frame image into the display areas in sequence; and after inputting the second target sub-frame image, delay the default buffer time and input the third target sub-frame image into the display areas in sequence.

The present disclosure further provides a server, which includes:

one or more processors;

a memory device; and one or more applications, wherein, the applications are stored in the memory device and configured to execute the display method of the display panel mentioned above by the processors.

Figure 8:
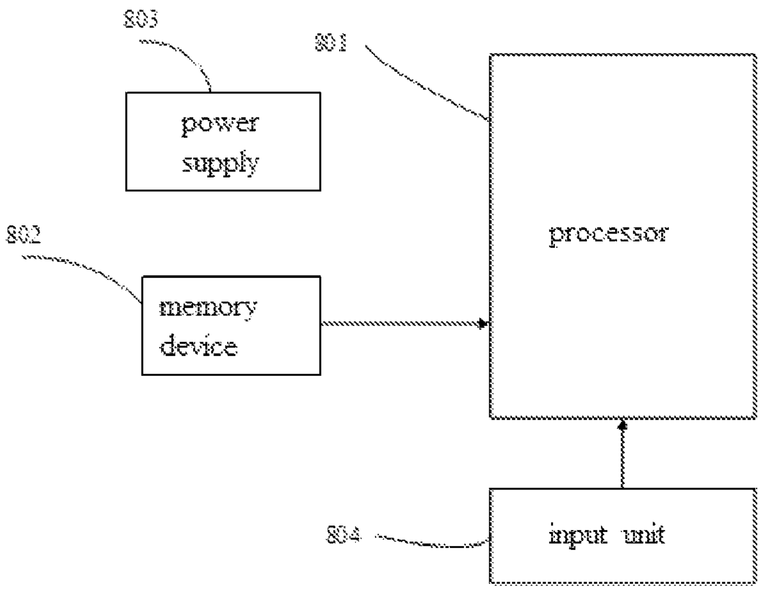
FIG. 8 is a schematic structural diagram of a server according to an embodiment of the present disclosure.

The present disclosure further provides the server, which integrates any one of display devices provided in the embodiments of the present disclosure. As shown in FIG. 8, FIG. 8 is a schematic structural diagram of the server according to an embodiment of the present disclosure.

Specifically, the server may include one or more processors 801 that process cores, one or more memory devices 802 of computer readable storage mediums, a power supply 803, an input unit 804, etc. It can be understood that a structure of the server shown in FIG. 8 does not constitute a limit to the server and may include more or fewer components than that shown in the figure, or may be arranged by combining some components or different components. Wherein, a processor 801 is a control center of the server, which uses various interfaces and lines to connect various parts of entire server, and executes various functions and processes data of the server by running or executing software programs and/or modules stored in a memory device 802 and calling the data stored in the memory device 802, thereby monitoring the server.

Optionally, the processor 801 may include one or more processing cores. Preferably, the processor 801 may integrate application processors and modem processors. Wherein, the application processors mainly deal with operating systems, user interfaces, and applications, and the modem processors mainly deal with wireless communications. It can be understood that the modem processors mentioned above may also not be integrated into the processor 801.

The memory device 802 may be used to store the software programs and modules, and the processor 801 executes various function applications and processes data by running the software programs and modules stored in the memory device 802. The memory device 802 mainly includes a program storage area and a data storage area. Wherein, the program storage area can store the operating systems, applications required for at least one function (such as a sound playback function, an image playback function, etc.), etc., and the data storage area can store data that is created according to use of the server, etc. In addition, the memory device 802 may include a high-speed random access memory device or a non-volatile memory device, such as at least one of disk memory devices, flash memory devices, or other volatile solid memory devices. Correspondingly, the memory device 802 may also include a memory device controller, thereby providing the processor 801 access to the memory device 802.

The server also includes the power supply 803 that supplies electricity to each component. Preferably, the power supply 803 may be logically connected to the processor 801 by a power supply management system, so functions such as charging, discharging, and power consumption managements can be realized by the power supply management system. The power supply 803 may also include one or more of components, such as direct current (DC) or alternating current (AC) power supplies, recharging systems, power supply fault detection circuits, power supply converters or inverters, and power supply status indicators.

The server may also include the input unit 804, which may be configured to receive input digital or character information and generate keyboard, mouse, joystick, optical, or trackball signal input related to user settings and function control.

Although not shown, the server may also include a display unit, which will not be repeated here. Specifically, in this embodiment, the processor 801 in the server will load executable files corresponding to processes of one or more applications to the memory device 802 according to following instructions, and the processor 801 will run the applications stored in the memory device 802, thereby realizing various functions. The instructions are:

obtaining the initial image that needs to be displayed, wherein, the initial image is one of the frame images of the display panel displayed in the target time; dividing the initial image into the plurality of sub-frame images, wherein, the frequencies of the sub-frame images are the same and are a multiple of the frequency of the initial image; taking each of the sub-frame images as the target sub-frame image, respectively, and inputting the target sub-frame image into the display areas in sequence; and in the display time of the initial image, combining the sub-frame images to obtain the target image, thereby displaying the target image in the display panel.

The present disclosure also provides a computer readable storage medium, which may include read-only memory devices (ROMs), random access memories (RAMs), magnetic disks, or optical disks. The computer readable storage medium stores a computer program, and the computer program is loaded by the processor to execute the steps of the display method of the display panel provided in the embodiments of the present disclosure. For example, the computer program is loaded by the processor to execute following steps:

obtaining the initial image that needs to be displayed, wherein, the initial image is one of the frame images of the display panel displayed in the target time; dividing the initial image into the plurality of sub-frame images, wherein, the frequencies of the sub-frame images are the same and are a multiple of the frequency of the initial image; taking each of the sub-frame images as the target sub-frame image, respectively, and inputting the target sub-frame image into the display areas in sequence; and in the display time of the initial image, combining the sub-frame images to obtain the target image, thereby displaying the target image in the display panel.

In the above embodiments, the description of each embodiment has its own emphasis. For the parts that are not described in detail in an embodiment, refer to the detailed description of other embodiments above.

In specific implementation, each of the above units or structures can be implemented as independent entities, or can be combined arbitrarily to be implemented as the same or several entities. The specific implementation of each of the above units or structures can be referred to the previous method embodiments, and will not be repeated here.

The display method of the display panel and the display device provided by the present disclosure are described in detail above. The specific examples are applied in the description to explain the principle and implementation of the disclosure. The description of the above embodiments is only for helping to understand the technical solution of the present disclosure and its core ideas, and it is understood that many changes and modifications to the described embodiment can be carried out without departing from the scope and the spirit of the disclosure that is intended to be limited only by the appended claims.

What is claimed is:

1. A display method of a display panel, wherein the display panel comprises a plurality of display areas arranged in an order from top to bottom, and the method comprises:

obtaining an initial image that needs to be displayed, wherein the initial image is one of frame images of the display panel displayed in a target time;

dividing the initial image into a plurality of sub-frame images, wherein frequencies of the sub-frame images are same and are a multiple of a frequency of the initial image, wherein the step of dividing the initial image into the plurality of sub-frame images comprises following steps:

obtaining the frequency corresponding to the initial image;

obtaining a red component, a blue component, and a green component of the initial image; and dividing the initial image into a red sub-frame image, a blue sub-frame image, and a green sub-frame image having a same frequency according to the red component, the blue component, and the green component, wherein the sub-frame images comprise the red sub-frame image, the blue sub-frame image, and the green sub-frame image having the same frequency;

taking each of the sub-frame images as a target sub-frame image, respectively, and inputting the target sub-frame image into the display areas in sequence, comprising following steps:

sorting the sub-frame images in a default order to obtain the sub-frame images after sorting;

taking the sub-frame images after sorting as a first target sub-frame image, a second target sub-frame image, and a third target sub-frame image, respectively;

inputting the first target sub-frame image into the display areas in sequence;

after inputting the first target sub-frame image, delaying a default buffer time and inputting the second target sub-frame image into the display areas in sequence; and after inputting the second target sub-frame image, delaying the default buffer time and inputting the third target sub-frame image into the display areas in sequence; and in a display time of the initial image, combining the sub-frame images to obtain a target image and displaying the target image in the display panel.

2. The display method of the display panel according to claim 1, wherein each of the display areas comprises a plurality of pixel units arranged in an array, and the display areas are arranged in the order from top to bottom;

the step of inputting the first target sub-frame image into the display areas in sequence comprises following steps:

inputting the first target sub-frame image into a plurality of rows of the pixel units in a determined display area at a same time; and after the first target sub-frame image is completely input into the determined display area, the first target sub-frame image is input into a next display area adjacent to the determined display area to realize inputting the first target sub-frame image into the display areas in sequence.

3. The display method of the display panel according to claim 1, wherein after the step of inputting the first target sub-frame image into the display areas in sequence, the method further comprises:

after inputting the first target sub-frame image into the display areas in sequence, sending a clock signal to the display panel and giving a hint to input the second target sub-frame image into the display areas in sequence.

4. The display method of the display panel according to claim 1, wherein each of the display areas comprises a plurality of pixel units arranged in an array and the method further comprises following steps:

after inputting the target sub-frame image into the display areas in sequence, the pixel units in the display areas are turned on; and controlling data to be written into the pixel units in the display areas at a same time.

5. The display method of the display panel according to claim 4, wherein the step of after inputting the first target sub-frame image, delaying the default buffer time and inputting the second target sub-frame image into the display areas in sequence, comprises following steps:

after inputting the first target sub-frame image, waiting for liquid crystals in the display panel to response and backlights to be turned on;

after delaying the default buffer time, determining if the liquid crystals in the display panel response and the backlights are turned on; and if the liquid crystals response and the backlights are turned on, inputting the second target sub-frame image into the display areas in sequence.

6. The display method of the display panel according to claim 5, wherein after the step of in the display time of the initial image, combining the sub-frame images to obtain the target image and displaying the target image in the display panel, the method further comprises:

after delaying the default buffer time, inputting a next frame image adjacent to the initial image.

7. The display method of the display panel according to claim 5, wherein the display panel comprises a plurality of rows of the pixel units arranged in the array, and the default buffer time ranges from a time required for turning on 200 rows of the pixel units to a time required for turning on 400 rows of the pixel units.

8. The display method of the display panel according to claim 7, wherein the default buffer time is a time required for turning on 300 adjacent rows of the pixel units in the display panel.

9. The display method of the display panel according to claim 1, wherein the frequencies of the sub-frame images are n*m, n refers to a type of the sub-frame images, and m refers to the frequency of the initial image.

10. The display method of the display panel according to claim 9, wherein n is 3, and the initial image is divided into three sub-frame images.

11. The display method of the display panel according to claim 1, wherein the frequency corresponding to the initial image is 60 HZ, and the frequencies of the sub-frame images are 180 HZ.

12. The display method of the display panel according to claim 1, wherein the step of dividing the initial image into the plurality of sub-frame images comprises following steps:

obtaining the frequency corresponding to the initial image;

obtaining a red component, a blue component, a green component, and a white component of the initial image; and dividing the initial image into a red sub-frame image, a blue sub-frame image, a green sub-frame image, and a white sub-frame image having a same frequency according to the red component, the blue component, the green component, and the white component, wherein the sub-frame images comprise the red sub-frame image, the blue sub-frame image, the green sub-frame image, and the white sub-frame image having the same frequency.

13. The display method of the display panel according to claim 12, wherein the frequency corresponding to the initial image is 60 HZ, and the frequencies of the sub-frame images are 240 HZ.

14. The display method of the display panel according to claim 1, wherein a frequency of the target image is same as the frequency of the initial image.

15. A server, comprising:

one or more processors;

a memory device; and one or more applications, wherein the applications are stored in the memory device and configured to execute the display method of the display panel according to claim 1 by the processors.

16. A display device, configured to drive a display panel to display images, wherein the display panel comprises a plurality of display areas arranged in an order from top to bottom, and the display device comprises:

an obtaining module configured to obtain an initial image that needs to be displayed, wherein the initial image is one of frame images of the display panel displayed in a target time;

a dividing module configured to divide the initial image into a plurality of sub-frame images, wherein frequencies of the sub-frame images are same and are a multiple of a frequency of the initial image;

an input module configured to take each of the sub-frame images as a target sub-frame image, respectively, and input the target sub-frame image into the display areas in sequence; and a driving module configured to combine the sub-frame images to obtain a target image in a display time of the initial image and display the target image in the display panel, wherein a target display area comprises a plurality of rows of pixel units arranged in an array, and the input module is configured to:

sort the sub-frame images in a default order to obtain the sub-frame images after sorting;

take the sub-frame images after sorting as a first target sub-frame image, a second target sub-frame image, and a third target sub-frame image, respectively;

input the first target sub-frame image into the display areas in sequence;

after inputting the first target sub-frame image, delay a default buffer time and input the second target sub-frame image into the display areas in sequence; and after inputting the second target sub-frame image, delay the default buffer time and input the third target sub-frame image into the display areas in sequence.

17. The display device according to claim 16, wherein the dividing module is configured to:

obtain the frequency corresponding to the initial image;

obtain a red component, a blue component, and a green component of the initial image; and divide the initial image into a red sub-frame image, a blue sub-frame image, and a green sub-frame image having a same frequency according to the red component, the blue component, and the green component, wherein the sub-frame images comprise the red sub-frame image, the blue sub-frame image, and the green sub-frame image having the same frequency.

* * * * *